United States Patent

Lukens

[15] 3,643,119

[45] Feb. 15, 1972

[54] VENTILATED DYNAMOELECTRIC MACHINE

[72] Inventor: Alan Franck Lukens, Schenectady, N.Y.

[73] Assignee: General Electric Company

[22] Filed: Nov. 5, 1970

[21] Appl. No.: 87,117

[52] U.S. Cl. .................................. 310/60, 310/62, 310/63
[51] Int. Cl. ....................................................... H02k 9/06
[58] Field of Search ............................... 310/60, 62, 63, 64

[56] References Cited

UNITED STATES PATENTS

| | | | |
|---|---|---|---|
| 1,996,460 | 4/1935 | Coates | 310/62 |
| 3,250,926 | 5/1966 | O'Reilly et al. | 310/60 |

FOREIGN PATENTS OR APPLICATIONS

| | | | |
|---|---|---|---|
| 1,404,940 | 5/1965 | France | 310/62 |

Primary Examiner—D. X. Sliney
Attorney—John J. Kissane, James C. Davis, Jr., Frank L. Neuhauser, Oscar B. Waddell and Joseph B. Forman

[57] ABSTRACT

A synchronous machine is described wherein a fan impels a coolant, typically air, into a first end of the generator and the air is divided into diverse streams which are passed in radially inward directions over the stator end turns disposed at opposite ends of the generator. Desirably, a plurality of arcuately displaced stationary vanes are positioned downstream of the intake fan to increase the air pressure within a zone circumferentially encompassing the end turn cavity proximate the fan and that portion of the pressurized air flowing radially into the end turn cavity is divided in axially opposite directions, i.e., one part of the air in the cavity passing axially through the rotor while the second part of the air is exhausted from the intake end of the generator after flowing across the exciter. A fan also is provided at the opposite end of the generator to increase air flow through the rotor and to assist in drawing air over the end turns at the opposite end of the generator.

8 Claims, 4 Drawing Figures

INVENTOR.
ALAN F. LUKENS 3,643,119

VENTILATED DYNAMOELECTRIC MACHINE

BACKGROUND OF THE INVENTION

This invention relates to dynamoelectric machines and, more particularly, to dynamoelectric machines having improved means for circulating coolant therein.

As dynamoelectric machines have become more efficient and more compact, the necessity for improved cooling means has become ever more pronounced. The smaller size of the machines and the increased electrical ratings thereof cause the machines to run hotter, which in turn necessitates improved insulation and more expensive materials and methods of construction. In prior art machines, a coolant, e.g., air, typically is pumped by means of a centrifugal fan into one end of the machine and various baffles or deflectors are employed to direct the air to different areas within the machine. In most common ventilation systems, the air is blown directly into one end turn cavity and passes over the radial inner surface of the end turns prior to being conveyed through various axial passages within the machine for exhaust at the opposite end of the machine. Even with an elaborate system of baffles, it will be appreciated that the effectiveness of the air as a heat transfer agent diminishes with span along the axial length of the machine and those portions of the machine lying "downstream" of the source of cooling air are not cooled as efficiently as those parts of the machine first encountering the newly admitted air. Moreover, pockets of stagnant air often tend to be formed within the end turn cavities of conventionally cooled machines reducing heat transfer from the machines.

It is therefore an object of this invention to provide a dynamoelectric machine having a more efficient cooling system.

It is a further object to provide a dynamoelectric machine wherein formation of stagnant air pockets within the end turn cavities is inhibited.

It is a still further object to provide a dynamoelectric machine wherein temperature gradients along the axial length of the machine are minimized.

SUMMARY OF THE INVENTION

In order to provide more efficient cooling of a dynamoelectric machine in accordance with this invention, a first fan is provided at one end, designated the intake end, of the machine for impelling coolant along a circumferential zone into the machine. The coolant will be described hereinafter as being air although any suitable fluid coolant may be employed without departing from the scope of this invention. The incoming air then is dissected into two flow streams, one flow stream passing axially within a ribbed frame contacting the stator while the remainder of the air is passed radially into the end turn cavity situated adjacent the intake end of the machine to cool the radially outer surface of the end turns. The flow stream within the end turn cavity at the intake end of the machine is again divided with a portion passing through the air gap and axial passages in the rotor, while the balance of the air flowing into the end turn cavity is directed in an axial opposite direction to be exhausted from the intake end of the machine. When that flow stream passing through the ribbed frame between the stator and machine housing arrives at the rear end of the machine, a portion of the stream is directed radially inward to impinge on the radially outer surface of the end turns and the inwardly directed stream combines with the air passed axially through the airgap and rotor to be exhausted from the rear end of the machine. Although the airflow technique of this invention is particularly effective in association with synchronous generators wherein the spacings between the pole windings provide axial passageways for the flowing air and the portion of air exhausted at the intake end of the machine can be advantageously employed to cool the exciter, it will be appreciated that the described air flow also can be employed in other machines, e.g., induction motors, without departing from the scope of this invention as defined in the claims.

BRIEF DESCRIPTION OF THE DRAWINGS

A more complete understanding of this invention can be obtained from the following detailed description of a preferred embodiment taken in connection with the accompanying drawings in which.

DESCRIPTION OF THE PREFERRED EMBODIMENTS

Figure 1:
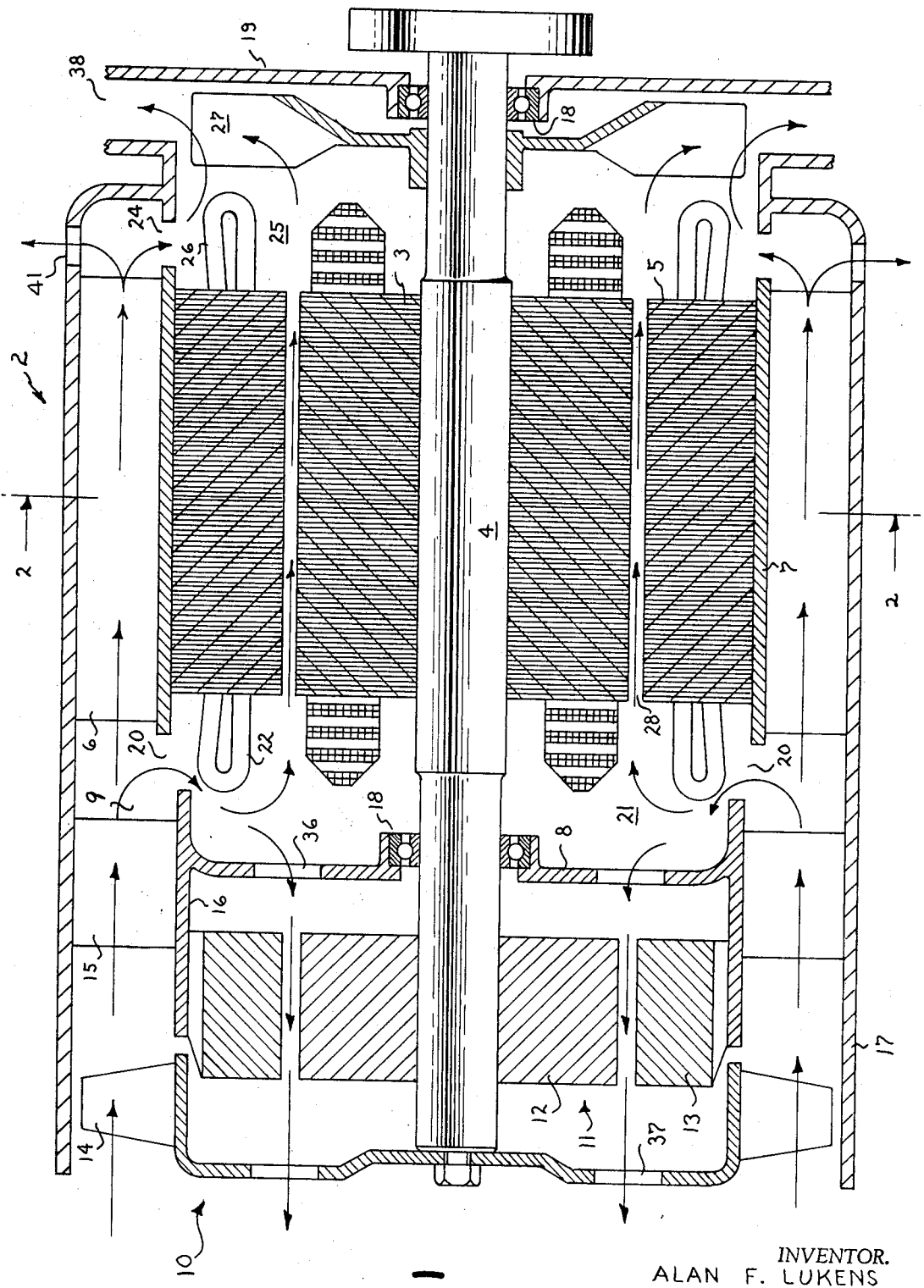
FIG. 1 is a longitudinal sectional view of a synchronous generator embodying the principles of the present invention.

Referring more particularly to FIG. 1, a synchronous generator 2 is illustrated which comprises a rotor 3 mounted on a shaft 4 for rotation within stator core 5. As will be recognized by those skilled in the art, rotor 3 and stator core 5 may advantageously consist of a plurality of steel punchings assembled together to form the respective laminated magnetizable structures. Stator core 5 is secured within a ribbed frame 6 having a radially inner annular plate 7 contacting the entire outer periphery of the stator core to maximize heat transfer from the stator core to the ribbed frame. Openings 20 are provided at the input end of the frame to bleed air off from an annular high pressure zone 9 produced in part, by flow resistance thru ribbed frame 6. An exciter, generally identified by reference numeral 11 and comprising a rotor 12 mounted on shaft 4 in an axial disposition relative to stator 13, supplies direct current energization for the windings of rotor 3 through rectifiers (not shown) in conventional brushless excitation fashion. A fan 10 also is fixedly secured to the forward end of shaft 4, and is provided with a plurality of radially extending blades 14 which may advantageously have an airfoil cross section for impelling air into the machine in a generally axial direction along annular zone 9 circumferentially disposed about exciter 11 (i.e., as indicated by arrows designating the airflow). Alternately, a radial fan having a suitable enclosure could be employed to produce the desired high volume axial flow of air within annular zone 9. Downstream from fan blades 14 are a plurality of radially disposed stationary blades, or vanes, 15 rigidly mounted between inner housing 16 and outer housing, or wrapper, 17 of the generator. These vanes generally are conventional in design and are employed as turbine blades to increase the air pressure within annular zone 9 downstream from the vanes. Because fan 10 desirably is mounted at the extreme end of shaft 4, rotation of and support for the generator shaft is provided by bearings 18 situated within inner partition 8 and end plate 19 located at the exhaust end of the generator.

Adjacent a first end of stator core 5 proximate the vanes, openings 20 are disposed at arcuately spaced intervals between the edge of ribbed frame 6 and inner housing 16 to divert some of the airflow from annular zone 9 in a radially inward direction into end turn cavity 21 to pass over the radially outer face of the stator end turns 22 situated therein. The remainder of the flowing air within annular zone 9 passes axially down the generator between ribs 23 extending upwardly from annular plate 7 to maximize heat transfer from the stator core to the air flowing within the ribbed frame. As will be recognized by those skilled in the art, ribs 23 may advantageously be formed integrally with annular plate 7. At the opposite, or rear, end of the stator core 5, a second group of arcuately displaced holes (identified by reference numeral 24) is situated for directing a portion of the air passed through the ribbed frame radially into end turn cavity 25 wherein the air flows over the radial exterior faces of end turns 26 while the majority of the air passed through the ribbed frame is exhausted through apertures 41 within fan housing 17. The air within end turn cavity 25 then is exhausted radially from the generator by an auxiliary fan 27 mounted on shaft 4. As fan 27 rotates, the fan provides suction drawing air from end turn cavity 21 through the axial passages extending through the generator. The suction produced by fan 27 also serves to draw air at a high velocity through holes 24 to scrub the back of end turns 26.

Figure 2:
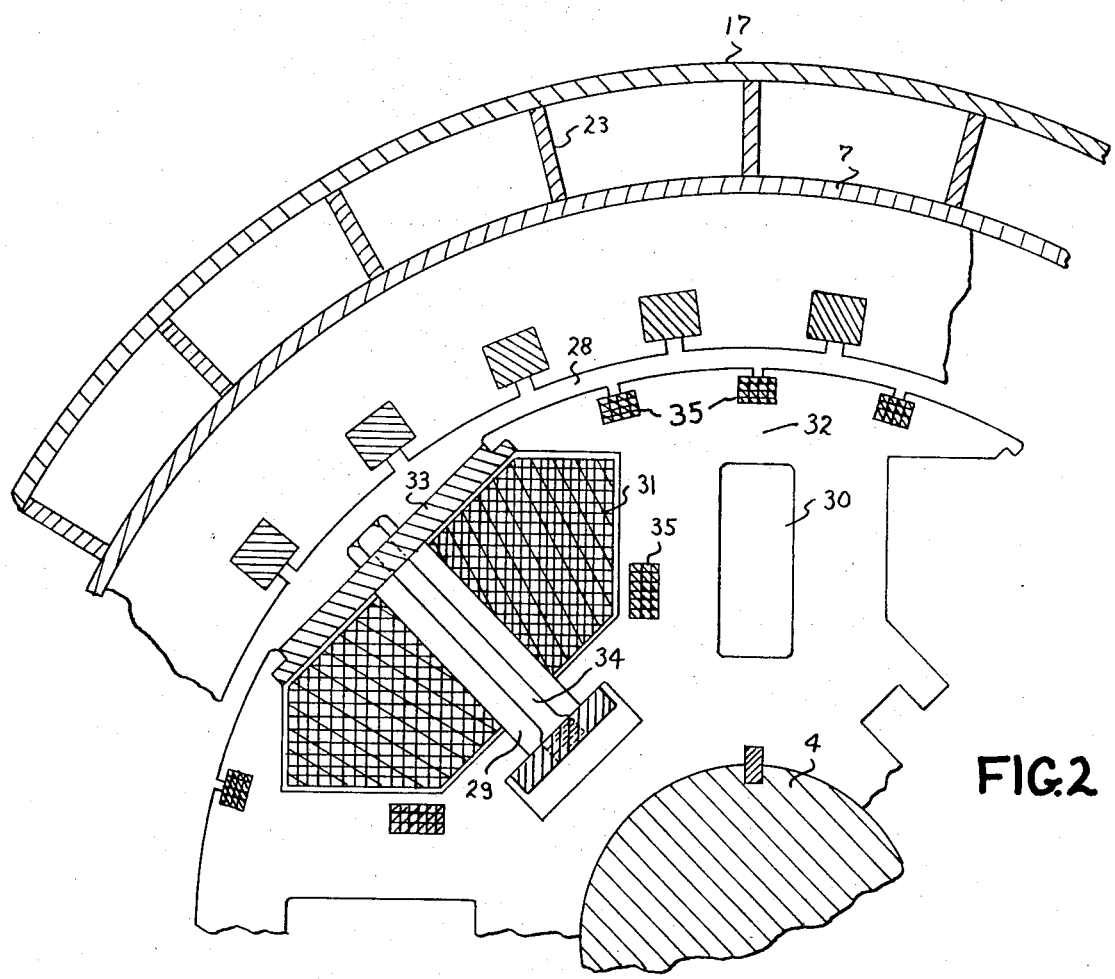
FIG. 2 is a partially broken away view of a transverse section of the generator taken along line 2—2 of FIG. 1.

The primary axial passages through the synchronous generator interior can be seen in FIG. 2 and generally comprise airgap 28 between the rotor and stator as well as axial ducts 29 and 30 formed between the pole windings 31 and within the pole arc portion 32 of the rotor, respectively. A nonmagnetic keeper 33 fixedly secured in position by the overlying lips of the adjacent pole tips in association with stud 34 extending radially between the rotor and the center of the keeper serves to inhibit radial motion of the windings during motor operation. In conventional fashion, amortisseur windings 35 also are provided within the rotor. It will be appreciated that when other types of machines are employed, axial passages may be provided only through the rotor laminations for facilitating the passage of air therethrough.

Figure 3:
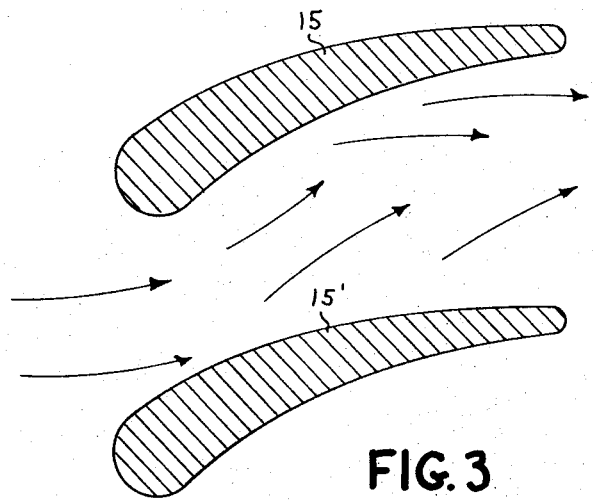
FIG. 3 is an enlarged transverse section of a pair of adjacent vanes employed to increase the air pressure at the intake end of the generator; and, FIG. 4 is an enlarged plan view illustrating a rotor end turn configuration which functions as a radial fan to ventilate the inner surface of the stator end turns.

FIG. 3 illustrates cross sections of a pair of the vanes 15, 15', which are located downstream from fan 10 in FIG. 1. Each of the vanes has an airfoil cross section and is disposed at an angle to the inrushing airstream. As the incoming air flows over the vanes, the aerodynamic configuration of the vanes produces an annular zone of high-pressure cooling air directly over end turn cavity 21 in accordance with well-known turbine principles.

Some of the high pressure air in zone 9 then is directed through openings 20 into end turn cavity 21 due to the pressure differential therebetween and the incoming air flows directly over the radially outer surface of end turns 22. A portion of the air flowing over end turns 22 then proceeds backwardly within the generator through openings 36 in partition 8 to cool exciter 11 prior to being discharged from openings 37 in the hub of fan 10. A second portion of the air passing across end turns 22 flows through airgap 28 and axial ducts 29 and 30 within rotor 3 (due to pressure in cavity 21 and suction produced by fan 27) before being exhausted radially through openings 38. That portion of the air from high-pressure annular zone 9 not directed into end turn cavity 21 flows back through ribbed frame 6 absorbing heat generated in the stator core and a majority of the air flowing in the ribbed frame is exhausted through apertures 41. A portion of the air, however, passes radially inward over end turns 26 to cool the radial outer surface of the end turns whereupon air combines with air drawn through the interior of the generator to be exhausted through openings 38.

Figure 4:
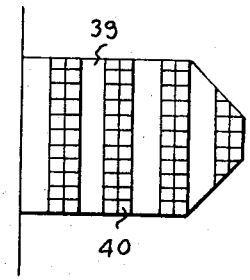

Additional circulation of air within the end turn cavities also is achieved by shaping the end turns of pole windings 31 in a manner producing a plurality of axially separated turns having air gaps 39 between the separate groups of turns 40 as shown in FIG. 4. The air gaps between the groups of turns not only assists in cooling the rotor end turns but the elongated extension of the end turns into the end turn cavity increases circulation of the air within the cavity to scrub the underside of the stator by acting as a radial fan. In general, at least three, and approximately six, axially separated groups of turns are preferred at the rotor winding end turns to maximize cooling of the field winding although a lesser number of separated turns could be employed if desired.

As can be appreciated from the foregoing description, the present invention provides improved cooling of dynamoelectric machines with structurally simple ventilating passages. Complex ductwork and baffles are rendered unnecessary and increased cooling of the entire machine is effected.

What is claimed as new and desired to be secured by Letters Patent of the United States is:

1. A dynamoelectric machine comprising a stator having windings inserted therein, a rotor axially mounted within said stator, means for impelling coolant into one end of said machine to produce an axial cooling flow stream within a zone situated radially outward of the end turns of said stator windings, means for dissecting said coolant flow stream into a plurality of diverse flow channels, means for directing respective ones of said flow channels in a radially inward direction to impinge individual flow streams upon the radially outer surfaces of the stator end turns situated at opposite ends of said machine and means for exhausting said coolant from said machine.

2. A dynamoelectric machine according to claim 1, wherein said exhaust means are disposed at both ends of said machine.

3. A dynamoelectric machine according to claim 2 further including means disposed at the coolant intake end of said machine for increasing the pressure of said axial coolant flow stream.

4. A dynamoelectric machine comprising a stator having windings inserted therein, a rotor mounted within said stator, first fan means for impelling coolant into a first end of said machine to form a pressurized zone circumferentially disposed about an end turn cavity at the first end of said machine, first distributing means for directing a first portion of said coolant axially along an annular zone disposed about the periphery of said stator, a cylindrical frame circumferentially contacting the entire radially exterior surface of said stator, said frame having a plurality of ribs protruding into said annular zone, means for bleeding a portion of coolant radially inward from said pressurized zone to impinge upon the radially outer surface of stator winding end turns disposed at the first end of said machine, means situated at the second end of said machine for directing a part of said first portion of coolant radially inward to impinge upon the radially outer surface of stator winding end turns disposed at the second end of said machine and means for exhausting said coolant from the second end of said machine.

5. A dynamoelectric machine according to claim 4 further including means for further directing part of said portion of coolant bled into the end turn cavity at the first end of said machine axially through said rotor and means for directing a second part of said bled portion of coolant in an axially opposite direction.

6. A dynamoelectric machine according to claim 5 further including exciter means disposed on a common shaft with said rotor, means for passing said second part of said bled portion of coolant across said exciter means and means disposed at said first end of said machine for exhausting said second part of said second portion of coolant.

7. A dynamoelectric machine according to claim 6, wherein said first fan means is an axial fan situated radially outward of said exciter means, said means for passing coolant across the exciter includes an apertured partition situated between said rotor and said exciter and said means for exhausting coolant from said second end of said machine includes a radial fan coaxially mounted with said rotor.

8. A dynamoelectric machine comprising a stator having windings disposed therein, a rotor mounted within said stator, first fan means coupled to said rotor for impelling coolant into a first end of said machine, a plurality of vanes disposed within the flow path of said first fan means for increasing the pressure of coolant passing between the vanes to develop a zone of pressurized coolant downstream of said vanes, means for distributing a first portion of said pressurized coolant in a radially inward direction into the end turn cavity situated at said first end of said machine to pass said first portion of coolant over the radially outer surface of the end turns situated therein, means for distributing the remainder of said pressurized coolant along an annular zone encompassing said stator, a portion of said remainder passing in a radially inward direction into the end turn cavity situated at the second end of said machine to pass over the radially outer surface of the end turns situated therein and means for exhausting said coolant from both ends of said machine.

* * * * *